(12) United States Patent
Hauke et al.

(10) Patent No.: US 9,065,787 B2
(45) Date of Patent: Jun. 23, 2015

(54) METHOD FOR SUPERVISING A CHAT CONNECTION

(71) Applicant: ATG Advanced Swiss Technology Group AG, Pfaeffikon (CH)

(72) Inventors: Rudolf Hauke, Kreuzlingen (CH); Roger Kueffer, Riggisberg (CH); Markus Holzer, Steffisburg (CH)

(73) Assignee: ATG Advanced Swiss Technology Group AG, Pfaffikon (CH)

( * ) Notice: Subject to any disclaimer, the term of this patent is extended or adjusted under 35 U.S.C. 154(b) by 250 days.

(21) Appl. No.: 13/870,510

(22) Filed: Apr. 25, 2013

(65) Prior Publication Data

US 2013/0325981 A1    Dec. 5, 2013

Related U.S. Application Data

(63) Continuation of application No. PCT/EP2012/060291, filed on May 31, 2012.

(51) Int. Cl.
| G06F 15/16 | (2006.01) |
| G06F 15/177 | (2006.01) |
| G06F 15/173 | (2006.01) |
| H04L 12/58 | (2006.01) |
| G06Q 10/10 | (2012.01) |

(52) U.S. Cl.
CPC ............... *H04L 51/04* (2013.01); *G06Q 10/10* (2013.01)

(58) Field of Classification Search
USPC ................. 709/203, 206, 218, 220, 222, 224; 700/259, 264; 726/26, 27; 348/14.01; 382/190
See application file for complete search history.

(56) References Cited

U.S. PATENT DOCUMENTS

| 8,111,281 | B2 * | 2/2012 | Sangberg et al. | 348/14.01 |
| 8,850,597 | B1 * | 9/2014 | Gates et al. | 726/26 |
| 8,887,300 | B1 * | 11/2014 | Gates et al. | 726/27 |
| 8,935,006 | B2 * | 1/2015 | Vu et al. | 700/264 |
| 2011/0172822 | A1 * | 7/2011 | Ziegler et al. | 700/259 |
| 2011/0243449 | A1 * | 10/2011 | Hannuksela et al. | 382/190 |
| 2012/0054691 | A1 * | 3/2012 | Nurmi | 709/206 |
| 2013/0325981 | A1 * | 12/2013 | Hauke et al. | 709/206 |

OTHER PUBLICATIONS

Natasha Singer: "Face Recognition Makes the Leap From Sci-Fi"; The New York Time, Nov. 12, 2011, retrieved from the internet.

(Continued)

*Primary Examiner* — Quang N Nguyen
(74) *Attorney, Agent, or Firm* — Muncy, Geissler, Olds & Lowe, P.C.

(57) ABSTRACT

A method for supervising a chat connection between at least two terminals is provided. The method includes verification of first conditions, including a camera at each terminal is operated, video streams of each camera are live streams, and/or each video stream contains images of a live person. The connection is allowed if all of the first conditions are met and if one second condition is met. A second condition can include one first subset of the persons is identified as belonging to one defined restricted group and an identity of a second subset of the persons is determined at least on the basis of facial and/or body features and the identified second person is classified as an allowed exception. The method also includes a pre-defined reaction if any of the first conditions and/or all of the second conditions are not met.

19 Claims, 1 Drawing Sheet

(56) References Cited

OTHER PUBLICATIONS

MD Maruf Monwar et al: "A Real-Time Face Recognition Approach from Video Sequence using Skin Color Model and Eigenface Method"; Electrical and Computer Engineering, Canadian Conference On, IEEE, PI, May 1, 2006, pp. 2181-2185.

Le Ha Xuan et al: "Face recognition in video, a combination of eigenface and adaptive skin-color model"; Intelligent and Advanced Systems, 2007. ICIAS 2007. International Conference on IEEE, Piscataway, NJ, USA, Nov. 25, 2007, pp. 742-747.

* cited by examiner

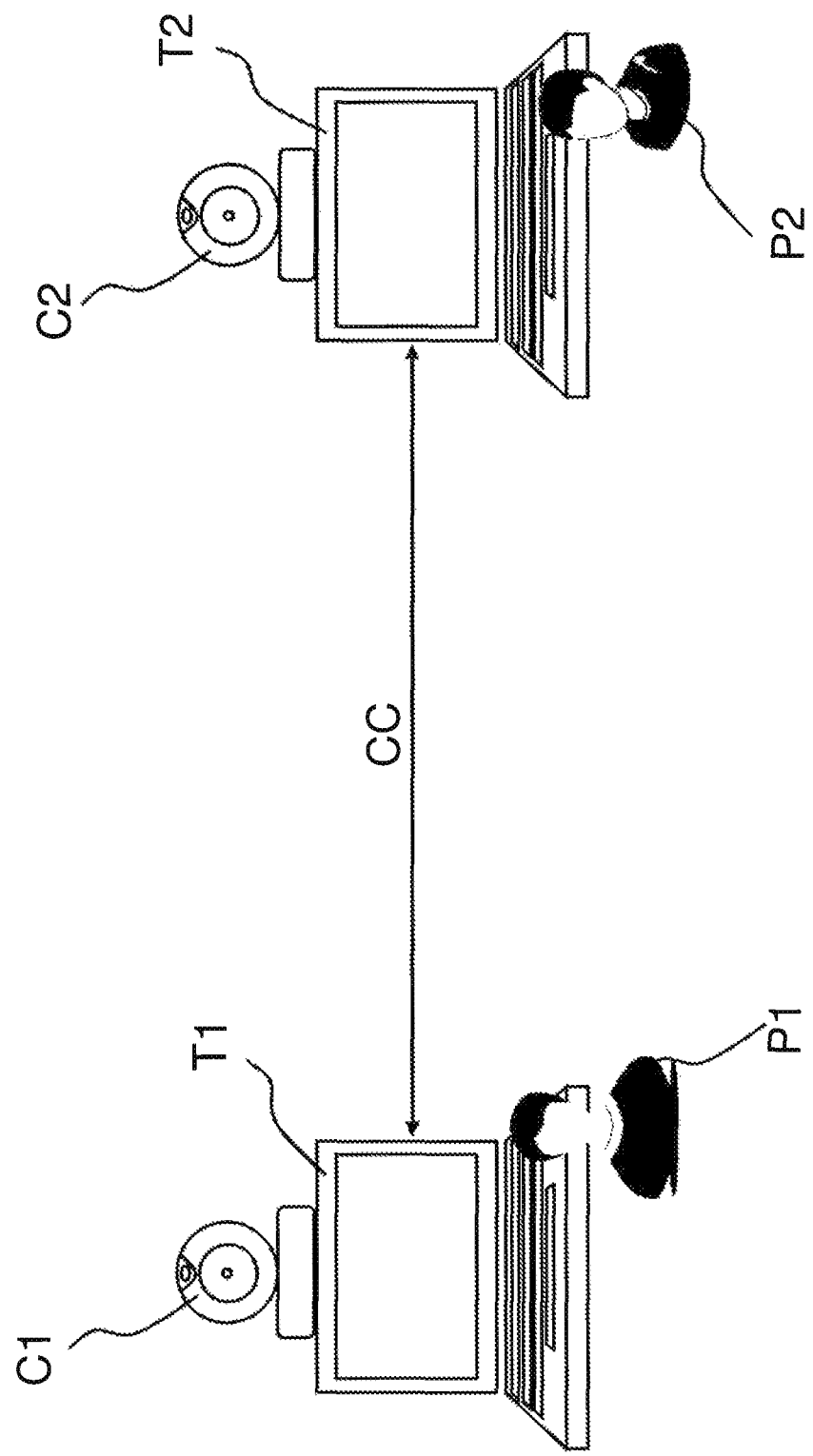

METHOD FOR SUPERVISING A CHAT CONNECTION

This nonprovisional application is a continuation of International Application No. PCT/EP2012/060291, which was filed on May 31, 2012, which is herein incorporated by reference.

BACKGROUND OF THE INVENTION

1. Field of the Invention

The present invention relates to a method for supervising a chat connection.

2. Description of the Background Art

The development of the internet has created new ways for social interaction between individuals such as chat connections, which are extensively used by minors and juveniles. While in other parts of the internet minors and juveniles are increasingly prevented from accessing inappropriate content, chat connections in principle allow communication between individuals of different age groups. Potential offenders may try to take advantage of this opportunity in order to establish inappropriate contacts to minors or juveniles.

SUMMARY OF THE INVENTION

It is therefore an object of the present invention to provide an improved method for supervising a chat connection.

According to an embodiment of the invention a method for supervising a chat connection between at least two terminals can include a verification of the following first conditions: a camera at each terminal is operated; video streams of each camera are live streams; and/or each video stream contains images of a live person. The connection can be allowed if all of the first conditions are met and if one second condition is met. A second condition is that one first subset of the persons can be identified as belonging to one defined restricted group and an identity of a second subset of the persons can be determined at least on the basis of facial and/or body features and the identified second person is classified as an allowed exception. The method also includes, in an embodiment, a pre-defined reaction if any of the first conditions and/or all of the second conditions are not met.

Verification of the first condition, wherein the camera at each terminal is operated, may be understood as monitoring whether the camera is permanently operated or at regular or irregular or arbitrary intervals, which have to be sufficiently short to make sure, that one and the same person remains in front of the terminal after having logged into the chat system.

An identity of the first subset of the persons may likewise be determined at least on the basis of facial and/or body features.

In an exemplary embodiment the method for supervising a chat connection between at least two terminals can include a verification of the following first conditions: a camera at each terminal is permanently operated; video streams of each camera are live streams; each video stream contains images of a live person; and/or an age of at least one of the persons is estimated at least on the basis of facial features and/or body features of the person retrieved from the video stream. The connection can be allowed if all of the first conditions are met and if one of the following second conditions is met: all persons belong to one and the same defined age group, or one first subset of the persons is identified as belonging to one defined restricted age group and an identity of a second subset of the persons is determined at least on the basis of facial features and the identified at least one person of the second subset is classified as an allowed exception. The method also includes, in an embodiment, a pre-defined reaction if any of the first conditions and/or all of the second conditions are not met.

In an embodiment, a subset of persons can include at least one person. In the case of one person per subset the chat connection is established or attempted to be established between two parties. However, the chat connection may also comprise three or more parties in which case one or both subsets comprise more than one person.

Facial and body features may likewise be used to determine the gender of the person. The determined gender of a person may be taken into account when deciding whether to allow the chat connection or not. For example, an adult woman may be allowed to contact a minor or juvenile while an attempt of an adult man may be denied. Likewise, the method may be configured to allow chat connections between persons of the same sex or of mixed gender, only.

Verifying that the video stream is a live stream is supposed to prevent individuals from faking their identity by just submitting a recorded video. The live video stream verification may be performed by prompting the person to perform a gesture and/or grimace or sequence of gestures and/or grimaces, e.g. presenting the thumb and/or a specified number of fingers to the camera and/or move head and/or hand to a specified position in the camera image in each gesture and verifying whether the person complies with that request. A live video stream may also prevent an offender from pretending to belong to the respective other sex and/or to belong to a different age group in order to facilitate approaching a potential victim as this pretense may easily be recognized by the other chat party.

The live verification of the person may comprise identification of at least one of the features eyelid movement, changes in facial expression, changes in beads of perspiration in the video stream, consistency between the voice and mouth or lip movements of the person. This may prevent an attempt of one chat party to present a photo or a dummy to the camera in order to fake their identity. Prompting the person to perform a gesture or sequence of gestures, e.g. presenting the thumb and/or a specified number of fingers to the camera in each gesture may be used for both, live verification of the person and the video stream.

If both or, in case of more than two, all persons belong to the same defined age group, e.g. all are classified as minors or juveniles or adults, the connection may be permitted without intervention.

In the other constellation, in which no intervention is required, the first subset of persons, i.e. at least one person, belongs to one defined restricted age group, e.g. minors or juveniles and the second subset of persons, i.e. at least one other person is in an arbitrary age group but is classified as an allowed exception.

In all other cases, i.e. if there is at least one person in a restricted age group and at least another person in a different group without being an allowed exception, the method according to the invention performs a pre-defined reaction.

The pre-defined reaction may comprise denying establishing a chat connection and/or interrupting an established chat connection or it may comprise sending a report to a surveillance instance, e.g. the parents of a minor or juvenile user or a law enforcement authority.

The method according to the invention efficiently prevents offenders from targeting younger potential victims. For instance, an adult may not contact a minor or juvenile and a juvenile may not contact a minor without authorisation.

The method may likewise work with a smaller or greater number and/or a coarser or finer definition of the age groups.

The facial features for determining the age or identity of the persons may comprise a dental development. Dental development, in particular of the front teeth, allows for a good estimate of a person's age. For instance, deciduous teeth may relatively well be distinguished from permanent teeth. The dental status may be particularly well assessed if the camera provides high quality images, e.g. high resolution, good lighting conditions, active illumination.

Body features for estimating the age of the person may comprise at least one body proportion, in particular a proportion between the torso and at least one extremity or between the torso and the head or between a width and a length of a body segment. Body proportions typically change in the course of the adolescence of individuals from the infant to the adult. In this so called allometric growth different growth rates of different body regions in specific states of the growth result in characteristic changes in the body proportions. For example, the relative height of the head and to a lower extent the relative height of the torso decreases with respect to the length of the legs in the course of adolescence. Girls in puberty typically exhibit an increased growth of the width of the pelvis while boys show an increased growth of the width of their shoulders. Likewise, the body proportion may include a ratio of the size of a hand to the size of the head.

Another feature for determining the age of the person may be the well established Tanner stadium, which however requires a nude image of the person. Instead of assessing the Tanner stadium it may be preferred to perform the pre-defined reaction when detecting that one of the persons is nude at all.

In another embodiment of the invention the facial features for estimating the age and/or determining the identity of the person may comprise at least one facial proportion. The facial proportion may be a relation between the development of the cranium and the facial bones. Typically, the infant cranium is very prominent relative to the facial bone as opposed to the less prominent juvenile and adult cranium relative to the facial bone due to an increased growth rate of the facial bone. Typically, the adolescent face expands in height, the lower jaw becomes more emphasized and in general growth of the face in the height and depth dimensions prevails over growth in width.

In an embodiment of the invention, the facial proportion is a so called index facialis relating the morphological height of the face to the width of the zygomatic arch. The index facialis is a measure correlated to the age with a high significance thus allowing a good estimate of the age of the person.

Other useful facial proportions may be obtained by determining and relating at least two of the facial features: maximum head length, maximum head width, minimum forehead width, width of the zygomatic arch, width above the auditory canal, angular width of the lower jaw, physiognomic height of the face, morphological height of the face, distance between the pupils, width between the inner corners of the eyes, width between the outer corners of the eyes, width of the nose, width of the oral opening, physiognomic height of the upper face, height of the nose, length of the nose, depth of the nose, physiognomic length of the ear, physiognomic width of the ear, depth of the upper face, depth of the lower face, horizontal circumference of the head.

In an exemplary embodiment not only the person or persons of the second subset but also the person or the persons of the first subset is or are identified on the basis of facial features. This requires access to a database with stored characteristic facial features of known persons. The allowed exception is determined by comparing the identified person of the second subset to persons stored in an exception database assigned to the identified first person. The databases may be established and/or maintained by the surveillance instance, e.g. the parents of an underage user. The database would then comprise the characteristic facial features of this underage user and the characteristics facial features of the persons defined to be allowed exceptions permitted to contact the underage user without having to be in the same age group. For example, the persons in the allowed exceptions groups may be relatives, such as parents, grand-parents, siblings, aunts, uncles or cousins.

In another embodiment of the invention the allowed exception may be determined by identifying similarities in the facial features of the persons of the first and second subset resulting in classification of the persons as relatives. This option may be particularly suitable for identifying close relatives who usually show a greater extent of similarities in their facial features than more distant relatives or strangers. Optionally, the facial features of the person of the second subset may be age corrected so as to match the age group of the person of the first subset before identifying the similarities thus taking into account that the facial features change depending on the stage of adolescence or age. It has been mentioned above that the facial proportions show a typical change during the course of adolescence. This allows for simulating the face of a person at a younger or older age starting from the current facial proportions and changing them in the way in which they typically change over time or reverse to create an image of the person at the desired age.

In an embodiment of the invention the facial proportion may be determined using graph matching, wherein a graph in the shape of a web comprising nodes connected by edges is fit into the image of a face in such a manner that the whole face is covered, wherein the nodes are placed at specific landmarks within the face, e.g. at the seilion, i.e. the deepest point of the nasal root depression, which can be located very precisely on images. Applying filter kernels to the resulting pattern allows for acquiring vectors for individual pixels of the image which are suitable for computing similarities between different faces. The method is particularly robust with respect to changes in illumination and contrast.

In another embodiment the facial proportion may be determined using the so called Eigenface analysis. Based on an extensive database of training faces a set of artificial faces, i.e. the main components of the covariance matrix of the training data, which carry the characteristic information of the face, is generated. Every face under test may be developed into a series of these Eigenfaces, wherein at the same time noise and other unwanted signal components are suppressed. The set of coefficients of this expansion in series is then used as a description of the face under test.

Acquisition of facial and/or body features for estimating the age and/or gender and/or recognizing the person's identity may be particularly reliable and robust when the camera is a stereoscopic camera. This allows for acquiring the said features even if the person is not looking straight into camera.

As an additional condition the estimated age and/or identity of at least one of the persons may be verified by issuing a request to present an identity document to the camera or to a document reading device at the respective terminal, acquiring data from the identity document and comparing the estimated age and/or identity to the data acquired from the identity document, wherein the pre-defined reaction is performed if the comparison fails. The identity document may be an ID card or a passport or another official document such as a driver's license or birth certificate. Comparison of the data acquired from the identity document may include the name, an image, an age, a birth date, a signature.

Furthermore, the age and/or identity of at least one of the persons may be verified by analyzing gestures and/or voice characteristics of the person, wherein the pre-defined reaction is performed if the verification fails.

Verification of the person's identity may include a voice recording and computation of a voice biometric or audio fingerprint. Verification of the person's identity may also include fingerprint recognition. Furthermore, verification of the person's identity may include a request to enter a phone number and a test call to the number, which may be performed automatically or by an operator.

In an exemplary embodiment the chat network may perform at least one the following steps when registering a new user: acquiring data from an identity document or another official document presented by the user; recording the user's voice and computing an audio fingerprint or voice biometric; requesting to enter a phone number and a performing a test call to the phone number, which may be performed automatically or by an operator; acquiring body features such as size of a hand and/or size of the head and computing a body proportion by relating two or more of the body features; and/or retrieving and logging an IP address of the user's terminal and/or localising the terminal using the retrieved IP address.

When logging in a registered user, the data acquired during registration may be verified for allowing or denying the login. Likewise the registered user may be identified using a keyfile such as an SSH key. The logged IP address and if applicable the location of the user's terminal may be verified in order deny or allow the login and/or to trace the user. For example, the login may be denied if the IP address of the terminal from which the user is trying to login differs from the IP address of the terminal used for registering the user.

During an established chat connection images of the user may be routinely captured and compared to the registered data. The chat system may further verify, that the camera is always recording and that the video stream and user are live. The chat system may prompt the user to speak certain words and/or phrases, capture the voice and compare it to the audio fingerprint or voice biometric. The chat system may provide alarm buttons at the terminals for allowing users to report incidents such as an offensive approach of one of the other users. Furthermore, chat dialogues may be monitored for identifying typical child's language in order to verify the age of the user. Furthermore, bad or bullying words or other keywords may be identified and filtered out or reported. Such keywords may be address data or phone numbers or login data of the chat room, which may be defined by the parents or other persons responsible for minor chat users. The system may also be configured to detect nudity or other illegal content in the images captured by the camera or in files exchanged between the terminals and react according to the age of the user. The chat system may further allow intervention of an administrator into an established chat connection. Reports to the parents or other authorities may be generated on any incident violating set restrictions such as nudity or restricted keywords. A report may likewise be generated routinely without a particular incident in order to inform the parents or authorities on the time, date and duration of the chat connection. The type of report generated may be configured by the parents or authorities. The amount of time allowed for chatting may likewise be configured by the parents or authorities. If this amount is exceeded the system may interrupt the connection and/or generate a report.

The method may be configured such that an attempt to contact a minor user requires the consent of a parent or another authority.

The system may rate a user by assigning scores depending on the number of successful logins in the chat room. The ratings, e.g. top chatter, expert, beginner, newby or a number of symbols such as stars, medals or cups may be arranged for allowing other users to estimate the user's experience.

Corresponding to the age and/or rating of the user they may be given access to different chat channels such as main (world), country, language, room (playroom, youth club, party club).

The camera may routinely, e.g. periodically or at random intervals capture an image of the person and compare it to the registered data. The connection may be interrupted in case of failure of the comparison or the user may be prompted to prepare for an imminent capture of his face after a predetermined number of failed attempts in order to maintain the connection. This may prevent one person logging in and then switching places with another person to allow the other person to continue the chat.

The method may likewise be used to control access to online platforms for dating, auctions, advertisements, social networks, online gambling. Users using the method for registering and/or logging in may be given a higher trustworthiness rating than users using other methods.

A terminal in the context of the present specification may be a computer such as a desktop computer, laptop computer, tablet computer or smart phone.

The method may be performed in one or more servers managing the chat network. Likewise, the method or part of it may be performed in the terminals.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein the FIGURE is a schematic view of a chat connection between two persons sitting in front of respective terminals with cameras.

DETAILED DESCRIPTION

In the FIGURE, there is illustrated a schematic view of a chat connection CC between two persons P1, P2 sitting in front of respective terminals T1, T2 with cameras C1, C2.

A method for supervising the chat connection CC between the at least two terminals T1, T2 comprises verification of the following first conditions: the camera C1, C2 at each terminal T1, 12 is permanently operated; video streams of each camera C1, C2 are live streams; and/o reach video stream contains images of a live person P1, P2.

The chat connection CC is allowed, i.e. established or maintained if all of the first conditions are met and if one second condition is met. A second condition is that one first subset of the persons, e.g. person P1 is identified as belonging to one defined restricted group, e.g. an age restricted group and an identity of a second subset of the persons, e.g. person P2 is determined at least on the basis of facial features and the identified second person P2 is classified as an allowed exception, e.g. by being on a buddy list of person P1. The method comprises a pre-defined reaction if any of the first conditions and/or all of the second conditions are not met.

An identity of the first subset of the persons, e.g. the person P1 may likewise be determined at least on the basis of facial features.

In an exemplary embodiment the method for supervising the chat connection CC between at least two terminals comprises verification of the following first conditions: the camera C1, C2 at each terminal T1, T2 is permanently operated; video streams of each camera C1, C2 are live streams; each video stream contains images of a live person P1, P2; and/or an age of at least one of the persons P1, P2 is estimated at least on the basis of facial features and/or body features of the person P1, P2 retrieved from the video stream.

The chat connection CC is allowed if all of the first conditions are met and if one of the following second conditions is met: all persons P1, P2 belong to one and the same defined age group; or one first subset of the persons P1 is identified as belonging to one defined restricted age group and an identity of a second subset of the persons P2 is determined at least on the basis of facial features and the identified at least one person P2 of the second subset is classified as an allowed exception.

In an exemplary embodiment the method may purely rely on age recognition without having to identify persons.

The live video stream verification may be performed by prompting the person P1, P2 to perform a gesture and/or grimace or sequence of gestures and/or grimaces, e.g. presenting the thumb and/or a specified number of fingers to the camera C1, C2 and/or move head and/or hand to a specified position in the camera image in each gesture and verifying whether the person complies with that request.

The live verification of the person P1, P2 may comprise identification of at least one of the features eyelid movement, changes in facial expression, changes in beads of perspiration in the video stream, consistency between the voice and mouth or lip movements of the person. Prompting the person P1, P2 to perform a gesture or sequence of gestures may be used for both, live verification of the person P1, P2 and the video stream.

The pre-defined reaction may comprise denying establishing a chat connection CC and/or interrupting an established chat connection CC or it may comprise sending a report to a surveillance instance, e.g. the parents of a minor or juvenile user or a law enforcement authority.

The facial features for determining the age or identity of the persons P1, P2 may comprise a dental development. Body features for estimating the age of the person P1, P2 may comprise at least one body proportion, in particular a proportion between the torso and at least one extremity or between the torso and the head or between a width and a length of a body segment. Likewise, the body proportion may include a ratio of the size of a hand to the size of the head.

In another embodiment of the invention the facial features for estimating the age and/or determining the identity of the person may comprise at least one facial proportion.

In one embodiment of the invention the facial proportion is a so called index facialis relating the morphological height of the face to the width of the zygomatic arch.

Other useful facial proportions may be obtained by determining and relating at least two of the facial features: maximum head length, maximum head width, minimum forehead width, width of the zygomatic arch, width above the auditory canal, angular width of the lower jaw, physiognomic height of the face, morphological height of the face, distance between the pupils, width between the inner corners of the eyes, width between the outer corners of the eyes, width of the nose, width of the oral opening, physiognomic height of the upper face, height of the nose, length of the nose, depth of the nose, physiognomic length of the ear, physiognomic width of the ear, depth of the upper face, depth of the lower face, horizontal circumference of the head.

In an exemplary embodiment not only the person or persons of the second subset but also the person or the persons of the first subset is or are identified on the basis of facial features. This requires access to a database with stored characteristic facial features of known persons. The allowed exception is determined by comparing the identified person of the second subset to persons stored in an exception database assigned to the identified first person. The databases may be established and/or maintained by the surveillance instance, e.g. the parents of an underage user.

In another embodiment of the invention the allowed exception may be determined by identifying similarities in the facial features of the persons of the first and second subset resulting in classification of the persons as relatives. Optionally, the facial features of the person of the second subset may be age corrected so as to match the age group of the person of the first subset before identifying the similarities.

In one embodiment of the invention the facial proportion may be determined using graph matching, wherein a graph in the shape of a web comprising nodes connected by edges is fit into the image of a face in such a manner that the whole face is covered, wherein the nodes are placed at specific landmarks within the face, e.g. at the seilion, i.e. the deepest point of the nasal root depression.

In another embodiment the facial proportion may be determined using the Eigenface analysis.

As an additional condition the estimated age and/or identity of at least one of the persons may be verified by issuing a request to present an identity document to the camera or to a document reading device at the respective terminal, acquiring data from the identity document and comparing the estimated age and/or identity to the data acquired from the identity document, wherein the pre-defined reaction is performed if the comparison fails. The identity document may be an ID card or a passport or another official document such as a driver's license or birth certificate. Comparison of the data acquired from the identity document may include the name, an image, an age, a birth date, a signature.

Furthermore, the age and/or identity of at least one of the persons may be verified by analyzing gestures and/or voice characteristics of the person, wherein the pre-defined reaction is performed if the verification fails.

Verification of the person's identity may include a voice recording and computation of a voice biometric or audio fingerprint. Verification of the person's identity may also include fingerprint recognition. Furthermore, verification of the person's identity in particular during registration with the chat network may include a request to enter a phone number and a test call to the number, which may be performed automatically or by an operator.

In an exemplary embodiment the chat network may perform at least one the following steps when registering a new user: acquiring data from an identity document or another official document presented by the user; recording the user's voice and computing an audio fingerprint or voice biometric; requesting to enter a phone number and a performing a test call to the phone number, which may be performed automatically or by an operator; and/or acquiring body features such as size of a hand and/or size of the head and computing a body proportion by relating two or more of the body features.

When logging in a registered user, the data acquired during registration may be verified. Likewise the registered user may be identified using a keyfile such as an SSH key.

During an established chat connection images of the user may be routinely captured and compared to the registered data. The chat system may further verify, that the camera C1, C2 is always recording and that the video stream and person P1, P2 are live. The chat system may prompt the user to speak certain words and/or phrases, capture the voice and compare it to the audio fingerprint or voice biometric. The chat system may provide alarm buttons at the terminals for allowing the connected persons P1, P2 to report incidents such as an offensive approach of one of the other users. Furthermore, chat dialogues may be monitored for identifying typical child's language in order to verify the age of the user. Furthermore, bad or bullying words or other keywords may be identified and filtered out or reported. Such keywords may be address data or phone numbers or login data of the chat room, which may be defined by the parents or other persons responsible for minor chat users. The system may also be configured to detect nudity or other illegal content in the images captured by the camera C1, C2 or in files exchanged between the terminals T1, T2 and react according to the age of the user. The chat system may further allow intervention of an administrator into an established chat connection. Reports to the parents or other authorities may be generated on any incident violating set restrictions such as nudity or restricted keywords. A report may likewise be generated routinely without a particular incident in order to inform the parents or authorities on the time, date and duration of the chat connection. The type of report generated may be configured by the parents or authorities. The amount of time allowed for chatting may likewise be configured by the parents or authorities. If this amount is exceeded the system may interrupt the connection and/or generate a report.

The method may be configured such that an attempt to contact a minor user requires the consent of a parent or another authority.

The camera may routinely, e.g. periodically or at random intervals capture an image of the person P1, P2 and compare it to the registered data. The connection CC may be interrupted in case of failure of the comparison or the user may be prompted to prepare for an imminent capture of his face after a predetermined number of failed attempts in order to maintain the connection CC. This may prevent one person logging in and then switching places with another person to allow the other person to continue the chat.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for supervising a chat connection between at least two terminals, the method comprising:
    verifying first conditions, the first conditions including: (a) a camera at each terminal is operated, (b) video streams of each camera are live streams, and (c) each video stream contains images of a live person;
    allowing the chat connection if all of the first conditions are met and if one second condition is met, the second condition including: (a) one first subset of the persons is identified as belonging to one defined restricted group, (b) an identity of a second subset of the persons is determined at least based on facial and/or body features, and (c) the identified second person is classified as an allowed exception; and
    performing a pre-defined reaction if any of the first conditions and/or all of the second conditions are not met;
    wherein, as a first condition, an age of at least one of the persons is estimated at least on the basis of facial features and/or body features of the person retrieved from the video stream, and wherein the connection is allowed if all of the first conditions are met and if one of the following second conditions is met:
    all persons belong to one and the same define age group; or
    the first subset of the persons is identified as belonging to one define restricted age group and the identity of the second subset of the persons is determine at least on the basis of facial features and the identified second person is classified as an allowed exception.

2. The method according to claim 1, wherein an identity of the first subset of the persons is determined at least on the basis of facial and/or body features.

3. The method according to claim 1, wherein the live verification of the person comprises identification of at least one of the features of eyelid movement, changes in facial expression, and/or changes in beads of perspiration in the video stream.

4. The method according to claim 1, wherein the video stream is identified as a live stream by requesting the person to perform a gesture and/or grimace and/or sequence of gestures and/or grimaces and verifying compliance with this request.

5. The method according to claim 1, wherein the facial features comprise a dental development and/or at least one facial proportion.

6. The method according to claim 1, wherein the body features comprise at least one body proportion or a proportion between the torso and at least one extremity or between the torso and the head or between a width and a length of a body segment.

7. The method according to claim 1, wherein the facial and/or body features are used to determine a gender of the person, and wherein the determined gender is taken into account when deciding whether to allow the chat connection or not.

8. The method according to claim 5, wherein the facial proportion is a relation between the development of the cranium and the facial bones.

9. The method according to claim 5, wherein the facial proportion is an index facialis relating the morphological height of the face to the width of the zygomatic arch.

10. The method according to claim 1, wherein the person of the first subset is identified on the basis of facial features, and wherein the allowed exception is determined by comparing the identified person of the second subset to persons stored in an exception database assigned to the first person.

11. The method according to claim 1, wherein the allowed exception is determined by identifying similarities in the facial features of the persons of the first and second subset resulting in classification of the persons as relatives.

12. The method according to claim 11, wherein the facial features of the person of the second subset are age corrected so as to match the age group of the person of the first subset before identifying similarities.

13. The method according to claim 5, wherein the facial proportion is determined using graph matching.

14. The method according to claim 5, wherein the facial proportion is determined using Eigenface analysis.

15. The method according to claim 1, wherein the pre-defined reaction comprises denying establishing a chat connection and/or interrupting an established chat connection.

16. The method according to claim 1, wherein the pre-defined reaction comprises sending a report to a surveillance instance.

17. The method according to claim 1, wherein an estimated age and/or identity of at least one of the persons is verified by issuing a request to present an identity document to the camera or to a document reading device at the respective terminal, acquiring data from the identity document and comparing the estimated age and/or identity to the data acquired from the identity document, and wherein the pre-defined reaction is performed if the comparison fails.

18. The method according to claim 1, wherein the age and/or identity of at least one of the persons is verified by analyzing gestures and/or voice characteristics of the person, and wherein the pre-defined reaction is performed if the verification fails.

19. The method according to claim 1, wherein the identity of at least the second subset of the persons is routinely re-determined during an established connection.

\* \* \* \* \*